Oct. 18, 1955 L. WOLMAN 2,721,269
ERROR RATE DAMPING CIRCUIT
Filed Oct. 4, 1951 3 Sheets-Sheet 1

INVENTOR.
*Lane Wolman,*
BY
*F. Munro Redman*
*Attorney.*

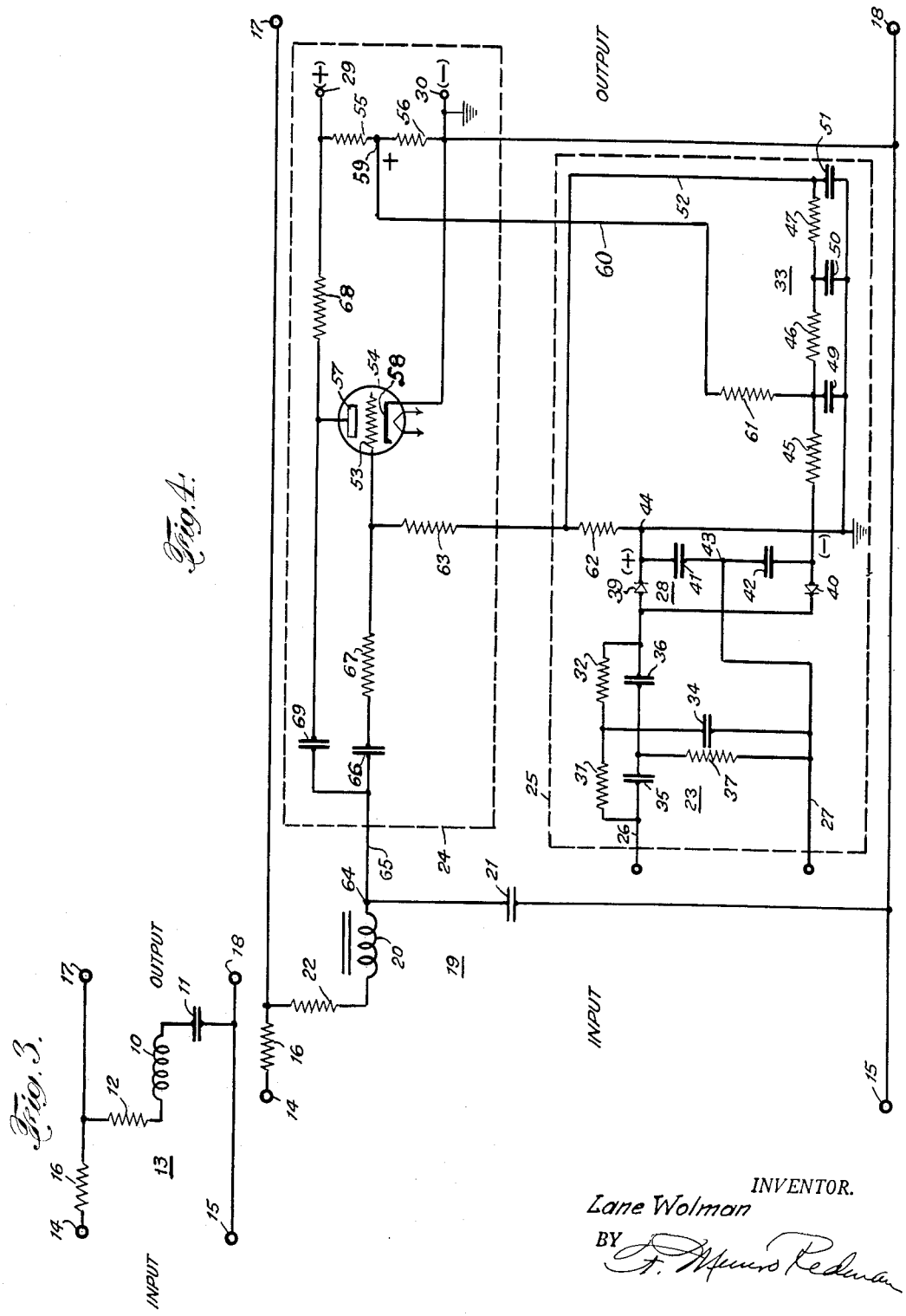

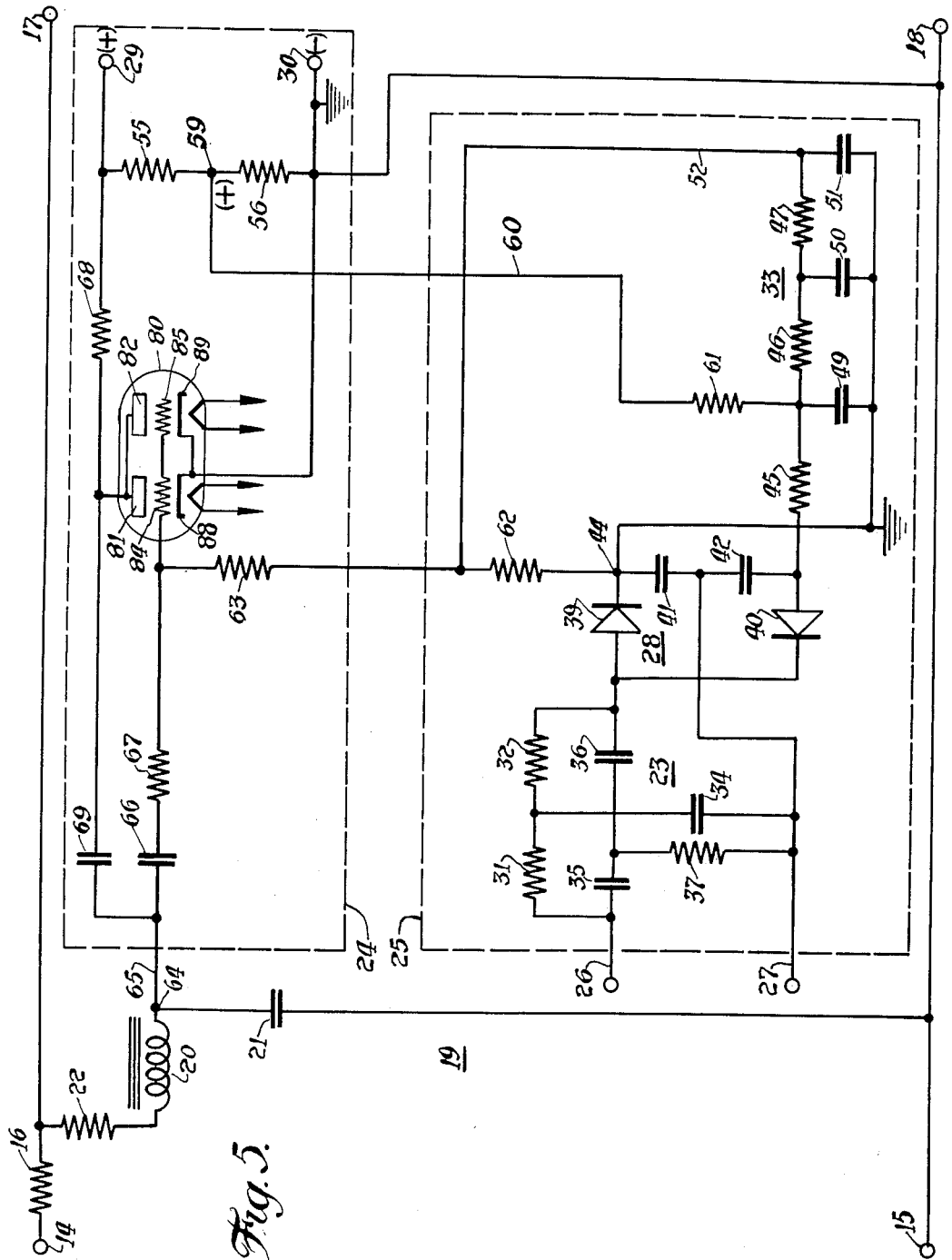

United States Patent Office 2,721,269
Patented Oct. 18, 1955

2,721,269

ERROR RATE DAMPING CIRCUIT

Lane Wolman, Van Nuys, Calif., assignor to Librascope, Incorporated, Glendale, Calif., a corporation of California Application October 4, 1951, Serial No. 249,711

6 Claims. (Cl. 250—40)

This invention relates to servo systems, and particularly to means for increasing the frequency tolerance of damping equipment to error rate signals in an alternating current servo loop.

The invention lies in the provision of resonant damping means for such apparatus which will continue to be effective despite fluctuations over a substantial range in the frequency and voltage of the power supply.

Servo systems for the introduction of variable factors into equipment for effecting the solution of many complex problems are well known. Such devices have been incorporated into a wide variety of automatic or semi-automatic means for controlling the performance of complex industrial machines or processes.

In servo systems generally, control is exercised over an input in accordance with the difference between the output and a desired value, or between the input and some function of the output. This difference, or error, sets up a signal which is fed back so to adjust the input as to produce an output of the proper value. Such signals may be mechanical or electrical, depending on the nature of the system.

Since, due to the inertia of the mechanical portion of the system, it takes a certain amount of time for it to respond to the error signal, there may be an over-correction, especially in the rudimentary types of servos. This results in "hunting," or a series of alternations about the correct setting for the particular moment, before the system approaches a steady state condition.

More refined systems effect an adjustment of the input in response to the rate at which the error is changing, as well as in response to the error itself. This improvement, known as error rate damping, reduces the likelihood of hunting to a substantial extent, or stabilizes the system.

In servo systems employing electrical components, the power supplied from the line may be a constant frequency alternating current of 60 cycles per second, for example. Using this supply, the error-measuring device will transmit a constant frequency or carrier current of amplitude proportional to the error. If the error is varying, the amplitude will be modulated, the side band frequencies being proportional to the rate at which the error is changing.

Series resonant circuits have been used to damp or stabilize such electrical servo systems. The carrier or line frequency is attenuated, and the side band, or error rate component, shifted in phase. The more sharply the resonant circuit is tuned, the greater will be the damping of the system.

The use of a series resonant damping circuit is subject to the disadvantage, however, that when variations in the supply line frequency do occur, the circuit may not be resonant at the new frequencies. The more efficient the circuit is made in damping, the more susceptible it will be to a loss of effectiveness during such undesired shifts in frequency. The present invention improves the tolerance of the damping system to such changes.

Fluctuations in the line voltage, and hence in the error signal voltage, may or may not affect the servo system, depending on the type of feedback and the construction of the servomechanism.

The present invention makes it possible for the resonant circuit to continue to be effective in damping the error signals in spite of irregularities in power line source by changing the effective resonant frequency in consonance with fluctuations in the supply frequency. The means presented are of such a nature as to function independently of variations in the line voltage over a substantial range.

The sharpness of resonance necessary for proper damping is retained by this method throughout frequency shifts over a range of the order of 10%, and while the voltage varies 10% at these frequencies. While the system will function for fluctuations beyond these ranges, the accuracy will not be as great.

It is thus an object of the invention to improve the resonant frequency tolerance of a circuit to changes in the frequency of power supplied thereto.

It is a further object to improve damping means for error rate signals in alternating current servo loops.

Another object is to render alternating current servo loop resonant damping means independent of frequency and voltage fluctuations in the current supply over a substantial range.

A still further object is to improve the performance of servo systems using an alternating current supply.

These and other objects will be apparent from the description following when taken in conjunction with the drawings, in which:

Fig. 3 is a schematic diagram of a previously known damping circuit, over which the present invention is an improvement;

Fig. 4 is a schematic diagram of the circuit of the invention, shown in block form in Fig. 2; and Fig. 5 is a schematic diagram showing another preferred embodiment of the invention.

Figure 1:
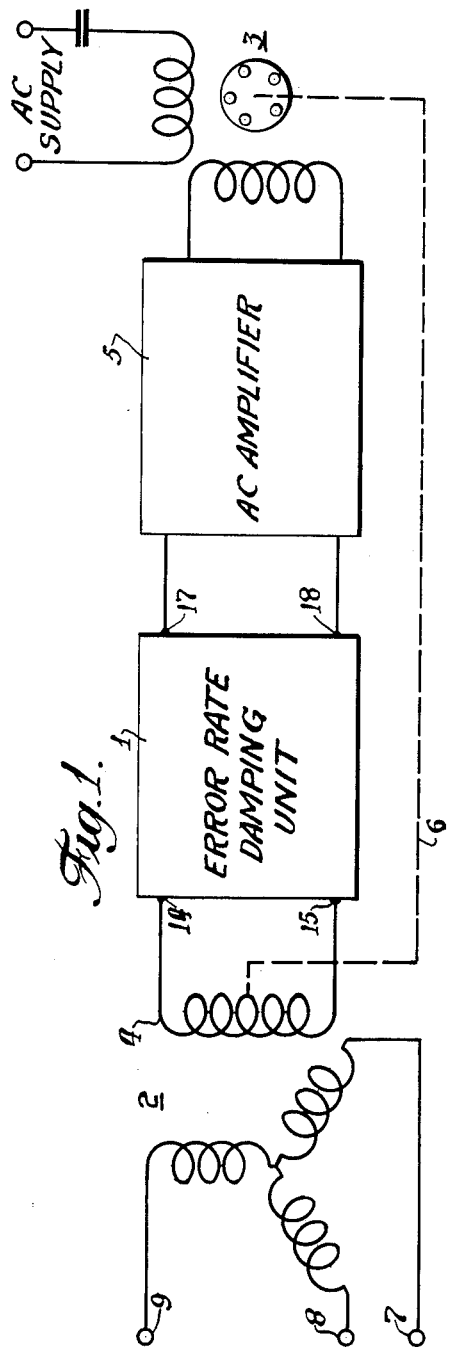
Fig. 1 is a block diagram showing the invention incorporated in a system exemplary of those in which it may be utilized.

It is to be understood that the embodiments shown in the drawings are illustrative only, and that the principles may be incorporated in other circuit arrangements and applied to a variety of other uses without departing from the spirit of the invention. For example, these principles are applicable to the maintenance of the condition of resonance of a sharply tuned circuit in many other situations in which the frequency of the current being supplied is undergoing substantial variations, such as the automatic tuning of radio or other electronic equipment, and it is in no wise intended to limit the invention to use with servo systems.

Referring now to the drawings for a more detailed understanding, there is shown in Fig. 1 a schematic circuit exemplary of the application of the invention to a closed loop alternating current servo system which may form part of an electronic computer. The remainder of the associated circuit has been omitted for the sake of clarity, but could be one of many familiar to those skilled in the art.

The damping unit 1 is illustrated as placed across the output of a synchro control transformer 2, which controls a servomotor 3. The output current from the rotor 4 of the control transformer is fed to the error rate damping unit 1, amplified in an A. C. amplifier 5, and applied to the servomotor 3. Information is supplied to the control transformer 2 by means of currents received thru lines 7, 8 and 9 from a synchro generator of conventional design, not shown. Rotor 4 of control transformer 2 is mechanically linked to the servomotor 3, as indicated by dotted line 6. This motor 3 may conveniently be of the two-phase induction type, with one phase energized by an A. C. source, not shown, and the other phase energized from the A. C. amplifier 5 as described hereafter. It will be understood that the servomotor 3 is arranged to drive the associated computer or other equipment thru suitable connections.

The proper rotational position at any instant for the rotor 4 of the synchro control transformer 2 is determined by the electrical field set up by the signal currents received thru lines 7, 8, and 9. The actual rotational position of rotor 4 at any instant will be determined by that of the servomotor 3, by virtue of the mechanical connection between them. Until the actual rotational position of servorotor 4 corresponds exactly to that of the electrical fied, potentials will be developed across the rotor which will tend to drive the motor 3 toward the correct position.

Since the power requirements placed on driving motor 3 are usually greater than can be met directly by the error signal furnished by the synchro control transformer 2, the error signal may be impressed on an alternating current amplifier 5 of conventional design connected between the control transformer rotor winding 4 and driving motor 3.

In accord with principles well known in the art, stabilization is improved by making the correcting signals proportional to the rate of change of the error, as well as to its magnitude at any instant. This may be accomplished, where the error signals are in the form of alternating currents, by the use of a differentiating network, in which the components are of such values as to constitute a circuit resonant at the carrier or line frequency.

Such damping of the system has been accomplished by means such as that shown in Fig. 3, in which a series circuit resonant to the error signal frequency is connected across the line. An inductance 10, capacitance 11 and resistance 12 may constitute the series resonant circuit 13. Current is applied thru input terminals 14 and 15 and line resistor 16, and then passed to the output terminals 17 and 18 with the signal currents modified by the series resonant circuit. The maximum effect is obtained in such action when the circuit 13 is most sharply resonant.

It follows, however, that if the frequency of the power supply source varies, the damping circuit will no longer be fully effective. The more sharply resonant the damping circuit, the more susceptible it is to being made substantially ineffective by frequency variations in the line supply. If the line voltage varies, producing an amplitude change in the error signal, the performance of the servo system may or may not be affected, depending on the construction of the servo-mechanism and on other factors such as the type of loop feed-back.

Figure 2:
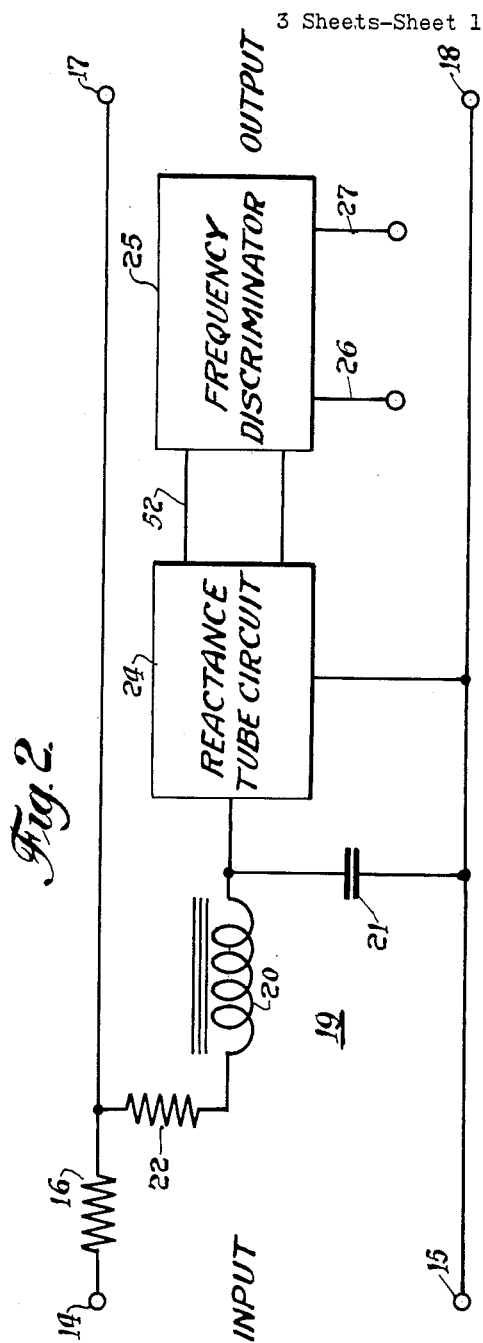
Fig. 2 is a block diagram of the error signal damping circuit of the invention.

The present invention, shown in block form in Fig. 2 and in the schematic circuit diagram of Fig. 4, overcomes these difficulties by shifting the resonant frequency of the damping circuit, indicated generally as 19, in consonance with frequency changes in the supply current, which effectively increases the frequency tolerance of the circuit, and by providing means for minimizing the effect of voltage changes in the supply on the frequency shifting means. Damping circuit 19 includes an inductive reactance 20, capacitive reactance 21 and resistance 22.

The shift in resonant frequency is obtained by properly varying the effective reactance of the damping circuit 19 with changes in the frequency of the supply. This is accomplished thru the use of a reactance tube circuit 24, so adjusted as to reflect reactance of a particular character, capacitive or inductive, across an element of the same character in the circuit 19 in a proper operative relation so that the overall frequency of resonance shifts with the line frequency. The value of reactance reflected is determined by the gain of the reactance tube, which is a function of the voltage applied to the control grid, in turn a function of the output of the frequency discriminator.

Although the reactance may be controlled at other points in the circuit, it is shown here as being varied thru shunting the reactance tube circuit across a capacitive reactance under the control of the frequency discriminator. The inductive reactance may also be similarly controlled. It will be understood that control could be accomplished by reflecting the inductive reactance either in series or in parallel with the inductive element 20.

The frequency discriminator may be, for example, of the parallel-T network type disclosed in U. S. Patent No. 2,106,785, issued February 1, 1938, to H. W. Augustadt. The discriminator may be fed thru input lines 26 and 27 from the same power supply, not shown, which energizes the error signal source and supplies anode power to the reactance tube. Circuit 24 as shown is arranged to reflect added effective capacitance in parallel with capacitance 21, under control of discriminator 25. This changes the effective reactance, and hence the resonance frequency, of damping circuit 19 in proportion to the power supply frequency shift.

The method used in connection with the reactance tube circuit 24 for minimizing the result of changes in the supply voltage is, briefly, that of varying the plate supply voltage and the grid bias on the reactance tube together, so that the overall gain of the tube remains constant. Details of this system will appear more clearly in connection with the discussion hereafter of the reactance tube and frequency discriminator circuits 24 and 25, respectively.

The frequency discriminator 25 is fed thru discriminator input lines 26 and 27 from an alternating current source which also supplies anode power to the reactance tube circuit 24. The anode power is obtained from a suitable rectifier connected to the reactance tube power supply terminals 29 and 30. The alternating current source and rectifier are conventional, and are not shown in the drawings. Discriminator 25 comprises a parallel-T network 23, a voltage doubling rectifier 28 and a filter 33. As detailed hereafter, input lines 26 and 27 supply current to the parallel-T network; the network 23 feeds into the rectifier-doubler 28; the output of the rectifier-doubler 28 is filtered; and a portion of the filtered output is applied, with an added component, as bias to control the operation of the reactance tube circuit.

The parallel-T network 23 is connected in the discriminator input lines 26 and 27, and is tuned for maximum attenuation at a frequency slightly below that at which the circuit 19 is resonant. For example, the network may be adjusted for maximum attenuation at 45 to 50 cycles per second when the anticipated frequency variation will be from 55 to 65 cycles. Its voltage output will then be proportional to frequency as changes in the supply occur. Network 23 is made up of two T-sections in parallel: two series resistance arms 31 and 32, from the common point of which a shunt capacitance arm 34 extends across to input line 27, are placed in the input line 26 and constitute one section; and two series capacitance arms 35 and 36, from the common point of which a shunt impedance arm 37 is connected to the input line 27, are shunted across the series impedance arms 31 and 32 of the first section to constitute the other section.

When the network 23 is tuned as above, its output voltage will depend on the applied frequency, and will be closely proportional to the frequency at any instant over the anticipated operating range of 55 to 65 cycles.

The output of frequency discriminating network 23 passes into a conventional full wave rectifier voltage doubler 28 consisting of two unilaterally conductive rectifier elements 39 and 40 and two capacitances 41 and 42. Line 26 is connected as an input to electrodes of different polarity on rectifier elements 39 and 40. Capacitances 41 and 42, having a common point 43 completing the circuit to line 27, are shunted across the opposite or input electrodes of rectifier elements 39 and 40. One side of the output of rectifier-doubler 28 is grounded at 44, and the other side feeds into the first impedance 45 of filter 33. The filter 33 is shown as conveniently made up of three half-T sections in tandem, comprising individually the series impedance arms 45, 46 and 47, and the shunt capacitance arms 49, 50 and 51, respectively.

The filter output, which is directed thru lead 52 toward the grid 53 of reactance tube 54, has an added component derived from the D.-C. power supply of the reactance tube. Voltage dividing resistors 55 and 56 disposed between the positive terminal 29 and negative terminal 30 are tapped at 59 to obtain a small amount of positive bias. The positive biasing potential so selected is introduced thru lead 60 and a resistor 61 into the filter 33, where it is mixed with the rectified output on the negative side of the frequency discriminator. The magnitude of this bias is so chosen that, when combined with the output of doubler 28, it will be of the proper value for control of tube 54 over the anticipated operating range of frequencies.

The combined and filtered output is connected across a high resistance 62, with its positive side grounded, and the negative side is applied thru grid return resistor 63 to grid 53, where it effects control of the gain. This results in varying the effective capacitive component, introduced in parallel with capacitive reactance 21, and hence the frequency of the resonant circuit, as will be seen by considering next the reactance tube circuit 24.

The reactance tube circuit 24 includes the vacuum tube 54, which may be a conventional triode having, in addition to grid 53, an anode 57 and a cathode 58 heated from a separate source, not shown. The grid 53 is connected to the common point 64 between the inductive element 20 and the capacitive element 21 of the series resonant circuit 19 thru a lead 65, a grid coupling condenser 66 and a grid resistor 67. The grid resistor 67 acts with grid return resistor 63 as a voltage divider, and is large enough to prevent over-driving the tube.

Anode power is obtained thru positive terminal 29 and negative terminal 30 from rectifier means, not shown, connected to the same source as that feeding the frequency discriminator 25. Resistor 68 is inserted between the positive supply terminal 29 and the anode 57. A coupling condenser 69 is connected from the anode 57 to the common point 64 between the inductive and capacitive components of damping circuit 19 thru lead 65.

Condenser 69 couples the output circuit of tube 54 across the capacitance 21 of the resonant circuit 19. Effectively, this coupling action reflects across capacitance 21, a capacitance and resistance in series. The magnitude of this effective impedance is proportional to the value of capacitance 69 and resistance 68 in series, multiplied by the gain of tube 54. There will be some variation in circuit Q with frequency, in part due to the effect of resistance 68, but this is not sufficient to materially affect the efficiency of the damping circuit. Since the tube cut-off point, and hence the gain, is controlled by the bias voltage delivered to grid 53 thru lead 52, the capacitance reflected across capacitance 21, and therefore the resonant frequency of circuit 19, varies with the line frequency at any instant. Thus, the damping is effective in spite of fluctuations in the supply frequency. It has been found that this arrangement is most effective if the supply line current does not contain an excessive amount of harmonics.

Supplying voltage fluctuations can be tolerated over a range of about 10% without interference with the compensation for frequency changes. As previously indicated, the anode supply thru terminals 29 and 30 is unregulated, so that variations in the line supply will appear as potential variations on anode 57. The variations in the frequency discriminator output developed at the same time across resistor 63 to ground and applied to the grid 53 will then compensate for the anode potential variations. An equivalent percentage change in the same direction in both will cause the load line intercepts and the bias point to shift together and will not change the effective gain of the tube. Hence the resonant frequency of the damping circuit 19 will be unaffected by such fluctuations in supply voltage.

In the circuit of Fig. 5, an embodiment has been illustrated in which a dual triode of the commercially known type 12AT7 is employed in place of the single triode shown in Fig. 4. The functioning of the circuit embodiments of Figures 4 and 5 is substantially identical, but as a practical matter it has been found that changes in other circuit constants due to variations in the characteristics of individual vacuum tubes of the same type may be substantially eliminated by the use of a dual triode. By connecting both halves of the dual triode in parallel, an average response is obtained which may permit greater uniformity in the other circuit constants employed in mass-production equipment.

Exemplary values for the circuit constants which have been found to provide satisfactory operation with the circuit of Fig. 5 when energized at a line frequency normally held at 60 cycles per second will be given below. The 12AT7 tube 80 has a potential of 210 volts supplied to the anodes 81 and 82 in parallel thru positive terminal 29 and negative terminal 30. The resistors 55 and 56 disposed across this anode supply, which is unregulated, are of 560,000 and 8,200 ohms, respectively. Resistor 68 is 56,000 ohms in value.

The discriminator circuit 23 is fed thru lines 26 and 27 with 100 volts A.-C. derived from the same source as that by which terminals 29 and 30 are supplied. The parallel T-series resistance arms 31 and 32 may be 10,000 ohms each, and the associated shunt arm 34 of .66 mfd. capacity. The series capacitance arms 35 and 36 may each be of .33 mfd. capacity and the associated shunt resistance arm 37 have a value of 5600 ohms. The rectifier units 39 and 40 may be the commercially known type 1N34 germanium diodes, and the voltage doubler capacitances 41 and 42 of .47 mfd. each.

The filter unit 33 makes use of .33 mfd. capacitances 49, 50, and 51, while the resistor 45 is 1.5 megohms, and resistors 46 and 47 are 180,000 ohms each. Resistor 61, thru which the bias component derived from the plate supply to tube 80 is mixed in the filter 33, is 1.5 megohms. Its value is chosen to determine the value of the voltage desired to be inserted in the filter circuit.

The mixed and smoothed output of filter 33 is applied across resistor 63, the value of which is 3.3 megohms, and the potential to ground there developed is directed toward the grids 84 and 85 of tube 80 thru the 2.2 megohm resistor 63. Resistor 63 functions, together with a 10 megohm resistor 67, as a voltage divider to prevent overdriving the tube. The value of resistor 63 determines the slope of the characteristic curve of tube 80. A grid condenser 66 of .01 mfd. value is used, and the value of capacitance 69 thru which the additional reactive effect is reflected into the damping circuit 19 is .007 mfd. Cathodes 88 and 89 are of the conventionally energized heater type.

The damping circuit 19 with which these values of constants have been utilized comprised a capacitance 21 of .057 mfd., an 80 henry iron core choke 20 with a Q of 22, and resistances 16 and 22 of 500,000 ohms and 100,000 ohms, respectively. These resistance values may be adjusted over wide ranges to suit the particular servo equipment with which damping circuit is to be used.

These circuit constants have been specified as representing an operative group of values, but it will be understood that all such constants are subject to change, depending on variations in the characteristics of the components and the circuits and equipment with which the invention is to function. With the values as given, the resonant frequency follows within 0.5 cycle per second variations in the line frequency from 55 to 65 cycles per second, and while the line voltage is varying ±10%.

From the above description, it may be seen that this invention affords effective means for maintaining a circuit in resonant condition over a substantial range of frequency and voltage variations in the power supplied thereto, as illustrated by, but not limited to, the particular embodiment in a damping circuit for error rate signals.

What I claim is:

1. In a combination with a damping circuit having an inductively and a capacitively reactive portion and arranged to be sharply resonant at a particular line frequency when current is supplied to said circuit from a power source, means for varying the frequency at which said circuit resonates in accord with variations in the frequency of line current supplied thereto, comprising a frequency discriminating network arranged to be supplied from said power source and having a rectifier and voltage doubler arranged to receive output current from said network, said network being tuned to a frequency somewhat below the line frequency anticipated to be received normally from said power source, a filter arranged to receive output current from said rectifier and voltage doubler; a reactance tube circuit having a tube with at least an anode, a cathode and a control element; means for providing rectified anode potential to said tube from said power source, means for feeding a portion of such anode potential applied across said tube to said filter along with the output current from said rectified and voltage doubler; means for applying a portion of the output of said filter to said control element to vary the gain of said reactance tube; and means for reflecting from said reactance tube an additional reactance value across said capacitively reactive portion of said damping circuit.

2. In a combination with a damping circuit having a capacitively reactive portion and arranged normally to be sharply resonant at a particular frequency when current is supplied to said circuit from a power source, means for varying the frequency at which said current resonates in accord with variations in the frequency of current supplied thereto, comprising a frequency discriminating network arranged to receive current from said power source and tuned to a frequency somewhat below that at which said damping circuit is normally resonant, whereby improper corrections may be avoided, a full-wave rectifier and voltage doubler arranged to receive the output from said network, and a filter arranged to receive the output from said rectifier and voltage doubler; a reactance tube circuit comprising a tube having at least an anode, a cathode and a control element, means for providing rectified anode potential to said tube from said power source, means for applying a portion of said anode potential to said filter along with the output of said rectifier and voltage doubler, means for utilizing the output of said filter to control the gain of said reactance tube, and means for shunting said reactance tube as an additional reactive value across said capacitively reactive portion of said damping circuit.

3. In a combination with a damping circuit having a capacitively reactive portion and arranged normally to be sharply resonant at a particular frequency when current is supplied to said circuit from a power source, means for varying the frequency at which said circuit resonates in accord with variations in the frequency of current supplied thereto, comprising a parallel-T frequency discriminating network arranged to receive current thru two lines from said power source and consisting of one branch having two resistance arms disposed in series in the first of said lines and having a common point connected by a capacitance arm to the second of said lines, and a second branch having two capacitance arms disposed in series in the first of said lines and in parallel with said two resistance arms, and having a common point between said two capacitance arms connected by a resistance arm to the second of said lines; said network being tuned to a frequency somewhat lower than the said particular frequency at which said damping circuit is normally resonant; a full-wave rectifier and voltage doubler arranged to receive output current from said network, and a filter arranged to receive output current from said rectifier and voltage doubler; a reactance tube circuit having a tube with at least an anode, a cathode and a control element; means for providing rectified anode potential to said tube from said power source, means for applying a portion of said anode potential to said filter along with the output of said rectifier and voltage doubler, means for utilizing the output of said filter to control the gain of said reactance tube, and means for shunting said reactance tube across said capacitively reactive portion of said damping circuit.

4. In an A.-C. servo system having lines thru which control signals may be transmitted and power supplied to a device to be controlled, and a high-Q series damping circuit normally resonant at a particular frequency shunted across said lines and having a capacitively reactive portion, means for varying the frequency at which said damping circuit is resonant in accord with changes in the frequency of the power supplied, comprising a reactance tube shunted across said capacitively reactive portion and arranged to reflect thereacross a capacitance proportional to the gain of said tube; and means for producing a control potential for said tube proportional to the difference between the frequency at any instant and the frequency at which said circuit is normally resonant, comprising a voltage discriminating parallel-T network tuned to a frequency somewhat below that at which said circuit is normally resonant, whereby an improper direction of corrective voltage may not be developed, rectifying and filtering means connected to the output of said network, means for applying a potential to the reactance tube to produce a flow of current through the tube and for introducing at least a portion of said potential into said filtering means, and means for utilizing the output from said filtering means to control the gain of said reactance tube.

5. In combination with an A.-C. servo system having lines thru which power is supplied from a power source to a device to be controlled and thru which control signals may be transmitted to said device, means for rapidly absorbing said control signals comprising a high-Q series-resonant damping circuit, tuned to the particular frequency at which power is supplied and said control signals are normally transmitted and having a capacitively reactive portion, shunted across said lines; and means for varying the frequency at which said series-resonant damping circuit is resonant in accord with changes in power supply frequency, comprising a reactance tube circuit having a reactance tube with at least a cathode, a grid, and an anode, shunted across a reactive portion of said damping circuit and arranged to reflect thereacross a reactive impedance proportional to the gain of said tube, means for producing a control potential from said power source proportional to the difference between the frequency at which power is normally supplied thru said lines and the frequency at any instant, comprising a voltage discriminating network tuned to a frequency somewhat below that at which said damping circuit is normally resonant, rectifying and filtering means connected to the output of said network, and means for compensating for the effect on said reactance tube circuit of variations in the voltage of the power supplied, comprising means for utilizing the said power source to furnish anode potential to said tube, means for introducing a portion of the anode potential across said reactance tube into said filtering means, and means for applying the output from said filtering means to said grid to control the gain of said reactance tube.

6. In combination with an A.-C. servo system having lines thru which power is supplied from a power source to a device to be controlled and thru which control signals may be transmitted to said device, means for rapidly absorbing said control signals comprising a high-Q series-resonant damping circuit, tuned to the particular frequency at which power is supplied and said control signals are normally transmitted and having a capacitively reactive portion, shunted across said lines; and means for varying the frequency at which said series-resonant damping circuit is resonant in accord with changes in power supply frequency, comprising a reactance tube circuit having a reactance tube with at least a cathode, a grid, and an anode, shunted across a reactive portion of said series-resonant damping circuit and arranged to reflect thereacross a reactive impedance proportional to the gain of said tube, means for producing a control potential from said power source proportional to the difference between the frequency at which power is normally supplied thru said lines and the frequency at any instant, comprising a parallel-T frequency discriminating network arranged to receive current thru two lines from said power source and consisting of one branch having two resistance arms disposed in series in the first of said lines and having a common point connected by a capacitance arm to the second of said lines, and a second branch having two capacitance arms disposed in series in the first of said lines and in parallel with said two resistance arms, and having a common point between said two capacitance arms connected by a resistance arm to the second of said lines; said network being tuned to a frequency somewhat below that at which said damping circuit is normally resonant, rectifying and filtering means connected to the output of said network, and means for compensating for the effect on said reactance tube circuit of variations in the voltage of the power supplied, comprising means for utilizing the said power source to furnish anode potential to said tube, means for introducing a portion of the anode potential across said reactance tube into said filtering means, and means for applying the output from said filtering means to said grid to control the gain of said reactance tube.

References Cited in the file of this patent

UNITED STATES PATENTS

| | | |
|---|---|---|
| 2,323,609 | Kihn | July 6, 1943 |
| 2,412,039 | Fyler | Dec. 3, 1946 |
| 2,446,567 | White et al. | Aug. 10, 1948 |
| 2,478,977 | Nicholson, Jr. | Aug. 16, 1949 |
| 2,503,046 | Hills | Apr. 4, 1950 |
| 2,544,643 | Ahrendt et al. | Mar. 13, 1951 |